United States Patent
Vinther et al.

(10) Patent No.: US 8,482,226 B2
(45) Date of Patent: Jul. 9, 2013

(54) LED LIGHT FIXTURE WITH BACKGROUND LIGHTING

(75) Inventors: Thomas Vinther, Beder (DK); Claus Hansen, Hornslet (DK)

(73) Assignee: Martin Professional A/S, Aarhus N. (DK)

( * ) Notice: Subject to any disclaimer, the term of this patent is extended or adjusted under 35 U.S.C. 154(b) by 99 days.

(21) Appl. No.: 13/321,288

(22) PCT Filed: Apr. 5, 2011

(86) PCT No.: PCT/DK2011/050110
§ 371 (c)(1),
(2), (4) Date: Dec. 14, 2011

(87) PCT Pub. No.: WO2011/131197
PCT Pub. Date: Oct. 27, 2011

(65) Prior Publication Data
US 2012/0091917 A1    Apr. 19, 2012

(30) Foreign Application Priority Data

Apr. 23, 2010   (DK) .................................. 2010 00361

(51) Int. Cl.
*H05B 39/04*   (2006.01)
(52) U.S. Cl.
USPC ............................ 315/312; 315/297; 315/307
(58) Field of Classification Search
USPC .................. 315/291, 294, 297, 307, 312, 324
See application file for complete search history.

(56) References Cited

U.S. PATENT DOCUMENTS

| | | | |
|---|---|---|---|
| 7,995,014 B2 * | 8/2011 | Lin et al. | 345/83 |
| 2007/0189010 A1 | 8/2007 | Arai | |

FOREIGN PATENT DOCUMENTS

| | | |
|---|---|---|
| EP | 1344684 A2 | 9/2003 |
| GB | 818164 A | 8/1959 |
| JP | 2005317348 A | 11/2005 |
| JP | 2009009809 A | 1/2009 |
| JP | 2010050060 A | 3/2010 |

* cited by examiner

*Primary Examiner* — Don Le
(74) *Attorney, Agent, or Firm* — Blank Rome LLP (57) ABSTRACT

An illumination device with a number of light sources arranged in at least two groups of light sources that are individually controllable. The first group of light sources (203) have light collectors (209) such as internal reflection (TIR) lenses, mixers or other lenses placed over them to collect and convert light of the light sources into a number of light source beams. The second group of light sources (205) pass light through diffusing areas (215) of a diffuser (213) in the form of a diffusion cover included in the lamp housing to diffuse the light and create a background light for the first group of light sources. The light from the first group of light sources pass through non diffusing regions (211) of the diffuser cover without the light being diffused. The second group of light sources are interleaved with the first group by the diffuser having one or several diffusion areas between non diffusion areas. By controlling both groups of light sources based on the same target color the dotted look of led light sources can be removed or by controlling the two groups of light sources based on two different colors light effects can be obtained. The illumination device can be included in a moving head light source with a base, a yoke connected rotatably to the base and the head connected rotatably to the head.

12 Claims, 8 Drawing Sheets

LED LIGHT FIXTURE WITH BACKGROUND LIGHTING

FIELD OF THE INVENTION

The present invention relates to an illumination device comprising a number of light sources and a number of light collecting means arranged in a housing. The number of light collecting means collect light from at least one of the light sources and convert the collected into a number of source light beams and the light source beams are emitted from said housing.

BACKGROUND OF THE INVENTION

Light fixtures creating various effects are getting more and more used in the entertainment industry in order to create various light effects and mood lighting in connection with live shows, TV shows, sport events or as a part on architectural installation.

Entertainment light fixtures creates typically a light beam having a beam width and a divergence and can for instance be wash/flood fixtures creating a relatively wide light beam with a uniform light distribution or it can be profile fixtures adapted to project an image onto a target surface. There is a tendency that more and more of this kind of fixtures are used in each show or each installation and the fixtures get as a consequence more and more visible for the sectors or TV viewers. The light fixtures typically create the lighting effect at a distance from the light fixture it self and the light fixture is thus not as interesting and esthetic to look at. The fixture manufactures tries as a consequence to provide the fixtures with esthetic designs in order to make the fixtures more interesting to look at. However this is very difficult as the housing of the fixtures typical dependents on physical requirements defined by the technical specifications of the fixture such as optics, mechanics, electronics, cooling etc.

The LED component has further as a light source changed the look of most lighting luminaries, when using multiple LEDs to replace a single light source. This implies for all lighting industries—general, domestic, industrial, entertainment etc. The most visible change is that all multiple light sources are now exposed to the viewer and the light emits from a larger area. Now that most LED fixtures have visible LEDs, some customers dislike the look of multiple light dots. Instead a more uniform, even light exit is requested, to avoid the cheap looking "funfair" look with an extreme amount of light sources. The dotted "funfair" look appears both on light fixtures which mixes the colors before the light is emitted from the housing and also of light fixtures where the colors are mixed in the air or at the wall.

DESCRIPTION OF THE INVENTION

The object of the present invention is to solve the above described limitations related to prior art. This is achieved by an illumination device and method as described in the independent claims. The dependent claims describe possible embodiments of the present invention. The advantages and benefits of the present invention are described in the detailed description of the invention.

DETAILED DESCRIPTION OF THE INVENTION

The present invention is described in view of a moving head lighting fixture including a number of LEDs that generate a light beam, however the person skilled in the art realizes that the present invention relates to illumination devices using any kind of light source such as discharge lamps, OLEDs, plasma sources, halogen sources, fluorescent light sources, etc. and/or combinations thereof. It is to be understood that the illustrated embodiments are simplified and illustrate the principles of the present invention rather than showing an exact embodiment. The skilled person will thus understand that the present invention can be embodied in many different ways and also comprise further components in addition to the shown components.

Figure 1A:
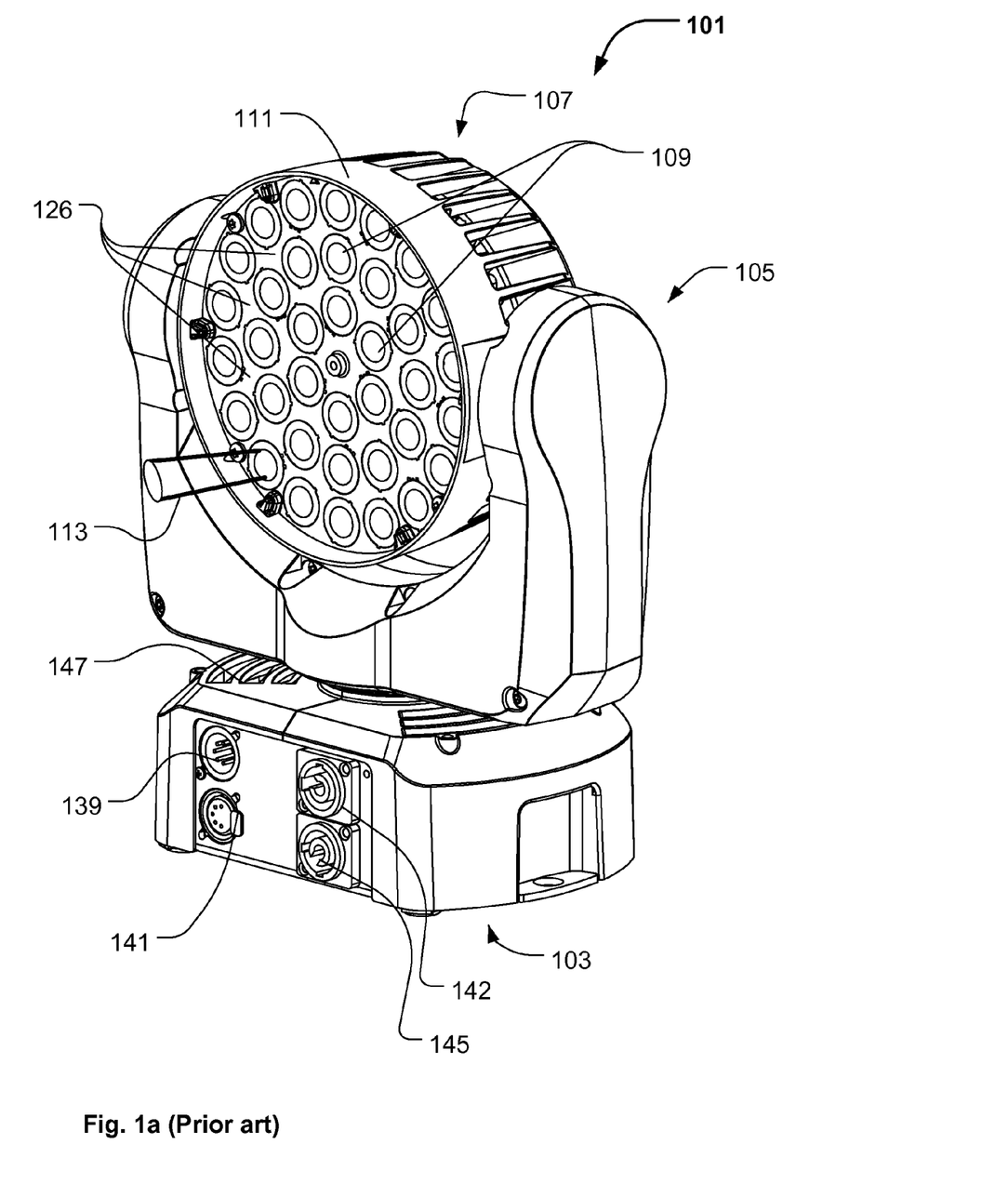
FIGS. 1a and 1b illustrate an example of a moving head lighting fixture according to prior art.
Figure 1B:
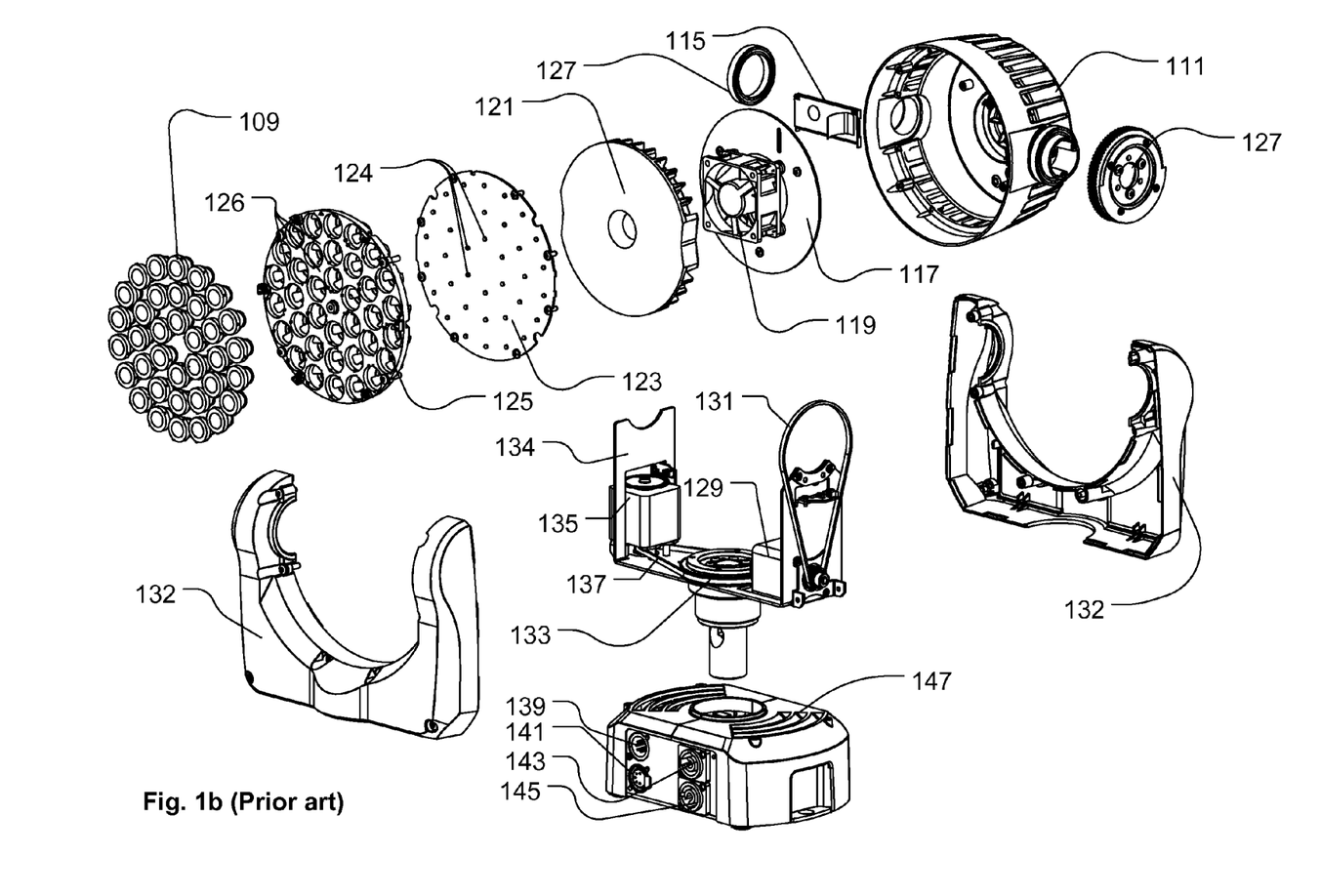

FIG. 1a-1b illustrate an illumination device according to prior art, where FIG. 1a is a perspective view and FIG. 1b is an exploded view. The illumination device is a moving head lighting fixture 101 comprising a base 103, a yoke 105 rotatable connected to the base and a head rotatable connected 107 to the yoke.

In the illustrated embodiment, the head comprises a number of light sources and a number of light collecting means 109 arranged in the head housing 111. The light collecting means collect light from at the light sources and convert the collected light into a number of source light beams 113 (only one illustrated), and which are emitted from the housing.

In the illustrated embodiment the head housing 107 is a "bucket" shaped head housing 111 wherein a display 115 (visible from the rear side of the head), main PCB 117 (Printed Circuit Board), a fan 119, a heat sink 121, an LED PCB 123, and lens assembly are stacked. The LED PCB 123 comprises a number LEDs 124 and the lens assembly comprises a lens holder 125 and a lens array where the lenses constitute the light collecting means 109. Each light collecting means is adapted to collect light form each LED and convert the collected light into a number of light source beams 113. The head is rotatable connected to the yoke by two tilt bearings 127, which are supported by the yoke 105. A tilt motor 129 is adapted to rotate the head through a tilt belt 131 connected to one of the tilt bearings 127. The yoke comprises two interlocked yoke shell parts 132 which are mounted to a yoke frame 134 where on the tilt bearings, tilt motor, pan motor and pan bearing are arranged. The LED PCB 123 comprises a number of LEDs emitting light and which in cooperation with the light collecting means 109 in the lens array generate a number of light source beams. The main PCB comprises controlling circuits and driving circuits (not shown) for controlling the LEDs as known in the art of illumination devices. The main PCB comprises further a number of switches (not shown) which extend through a number of holes in the head housing 111. The switches and display act as a user interface allowing a user to communicate with the moving head lighting fixture.

The yoke are connected to a pan bearing 133 rotatable connected to the base 103. A pan motor 135 is adapted to rotate the yoke through a pan belt 137 connected to the pan bearing 133. The base comprises 5-Pin XLR male 139 and female 141 connectors for DMX signals as known in the art of entertainment lighting; input 143 and output power 145 connectors, power supply PCB's (not shown) and fan (not shown). The fan forces air into the base through vent holes 147.

This prior art illumination device uses multiple LEDs to replace a single light source as known prior the introduction of the LED component as a widely used light source. However such illumination device changes its visible appearance as the multiple light sources are now exposed to the viewer and the light emits from a larger area. If the light luminaries are a color mixing version with single color LEDs, then all LED colors used are visible. However some customers dislike the look of multiple light dots. Instead a more uniform, even light exit is requested, to avoid the cheap looking "funfair" look with an extreme amount of light sources.

The illuminating device illustrated in FIGS. 1a and 1b is just one example of a prior art illumination derive and the skilled person realize that a large number of different embodiments provided by a large number of manufactures exits.

Figure 2A:
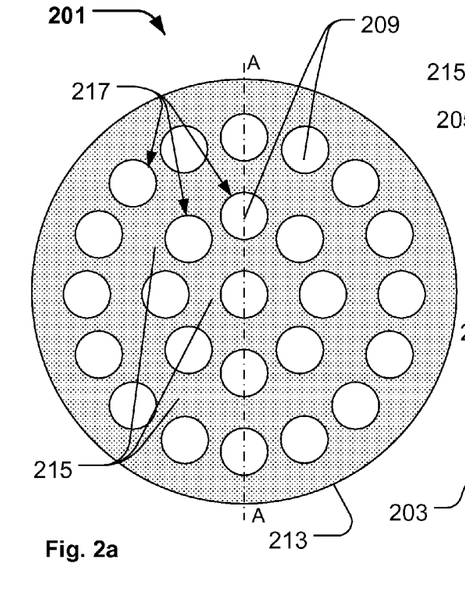
FIG. 2a-2c illustrate an embodiment of an illumination device according to the present invention.
Figure 2B:
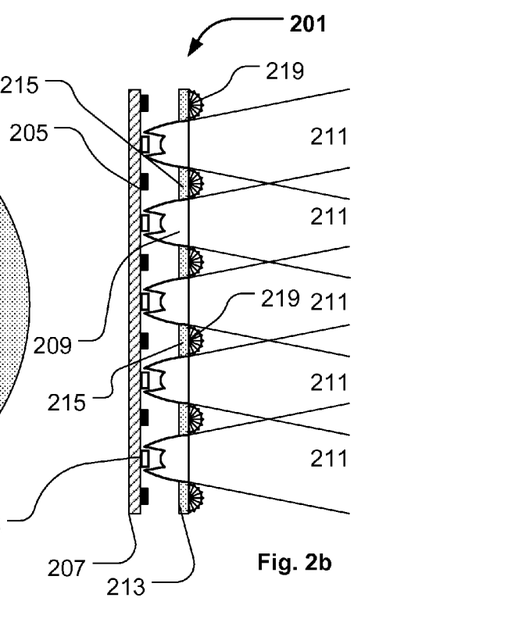
Figure 2C:
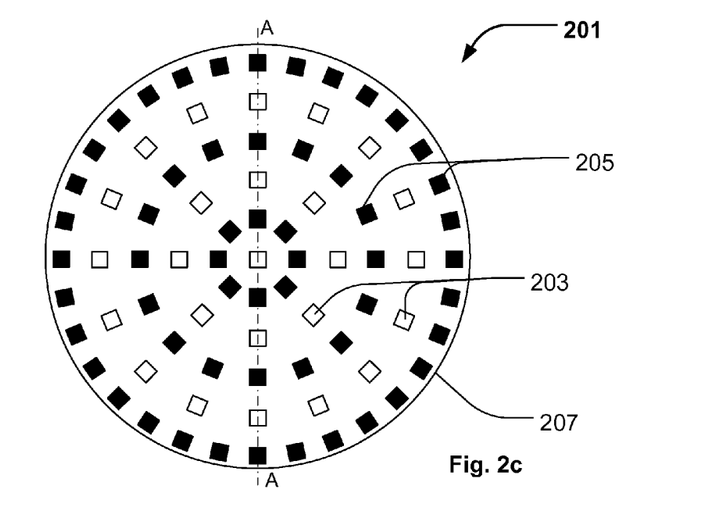

FIGS. 2a-c illustrate a simplified embodiment of the illumination device 201 according to the present invention. FIG. 2a illustrate a top view, FIG. 2b illustrates a cross sectional view along line A-A and FIG. 2c illustrates a top view with the diffuser cover removed.

The illumination device 201 comprises a number of light sources arranged in a first group of light sources 203 (indicated as white quadrangles) and in a second group of light sources 205 (indicated as black quadrangles). The light sources are mounted on a PCB 207 (printed circuit board) and the two groups of light sources can be controlled individually for instance by a controller (not shown) as known in the art of lighting. The controller is thus adapted to treat the two groups of light sources as at least two individual light sources which can be individually controlled. However the skilled person realizes that the illumination device also can be adapted to divide each group of light sources into a number of subgroups which also can be controlled individual and that it is also possible to control each single light source individually. A number of light collecting means 209 are arrange above and around the first group light sources 203 and is adapted to collect light from the first group of light sources and convert the collected light into a number of source light beams 211. The light collecting means 209 can be embodied as any optical component capable of collecting light from the light sources and convert the light into light beams and can for instance be optical lenses, light mixers, TIR lenses etc. In the illustrated embodiment the light collecting means 209 are embodied as TIR lenses as known in the prior art and the skilled person realizes that the TIR lens can be designed according the light output of the light source and the descried optical properties of the source light beam 211. The light beams 211 will merge into one large light beams as the distance to the illumination device increases.

The illumination device comprises a diffuser cover 213 arranged above the PCB 207 and the diffuser cover comprises at least one diffuser region 215 and at least one non-diffusing region 217. The diffuser regions receive 215 light generated by the second group of light sources 203 and diffuse the received light in many directions as illustrated by arrows 219. The consequence is that a new light effect can be created as the area between the light beams can have another color emitted by the second group of light sources. This look can by dynamic if first group of light sources and the second group of light sources are individually controlled as known in the art of entertainment lighting. The second group of light sources can also be adapted to emit light having substantially the same color as the light emitted by the first group whereby the surface of the illumination device appears as one surface having the same color. The diffusing regions can be arranged between the non-diffusing regions whereby the dotted look can be avoided as the areas between the non-diffusing regions now have substantially the same color as the light beams 211 exiting the illumination device through the non-diffusing regions.

The second group of light sources can functions as background lighting with own DMX control and both color and intensity can be varied independently of the first group of light sources. They can also be intensity and color linked with first target color in a predetermined manner or has separate control for contrast colors or other intensity. This adjustment/control of the light sources can be done remotely from a central control unit or at the fixture itself.

The present invention can for instance be integrated into the prior art illumination device illustrated in FIG. 1a-1b by arranging the second group of light sources between the original LEDs 124 at the LED PCB 123 and letting the light from these light sources be diffused by areas 126 of the lens holder 125 which are positioned between the lens holders 125.

Figure 3A:
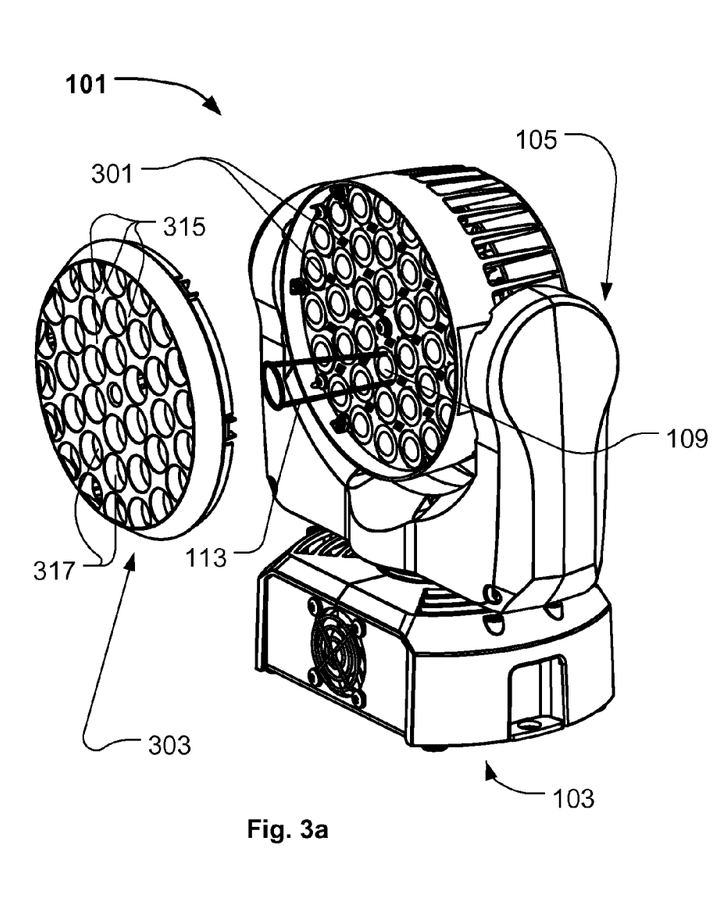
FIG. 3a-3b illustrate the illumination device of FIG. 1a-1b modified into an illumination device according to the present invention.
Figure 3B:
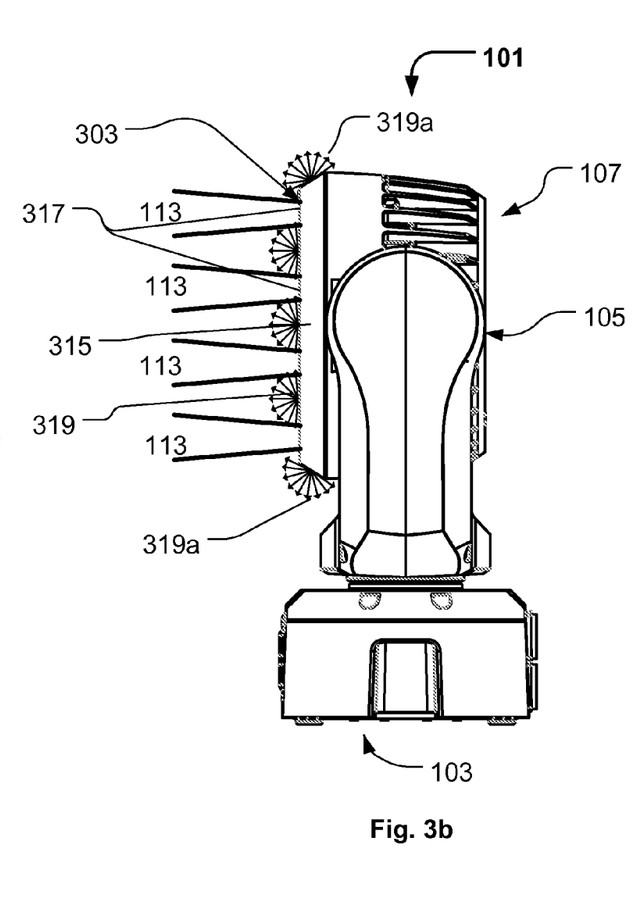

FIG. 3a and FIG. 3b is respectively a perspective view and a side view of the illumination device of FIG. 1a-1b which has been modified into an illumination device according to the present invention.

In this embodiment a number of LEDs 301 (illustrated as black quadrangles) have been mounted at the lens holder 125 between the light collecting means 109. This can for instance be achieved by embodying the lens holder as a PCB with a number of holes wherein the light collecting means can be arranged or by adding a PCB to the original lens holder. The original LEDs 124 (see FIG. 1b) and the added LEDs 301 and are adapted to function as respectively a first group and a second group of light sources that can be controlled individually.

Further the head housing comprises a diffuser cover 303 (exploded from the housing in FIG. 3a and mounted in FIG. 3b) comprising at least one diffuser region 315 and at least one non-diffusing region 317. The diffuser regions 317 receive at least a part of the light generated by the second group light sources and diffuses the received light as indicated by arrows 319 (only indicated on FIG. 1b for the sake of simplicity). At least at part of the number of source light beams 113 pass through the non-diffusing regions 315 without being diffused. It is to be noted that only some of the light source beams are illustrated for the sake of simplicity. The result is that the dotted LED front look is removed, by lighting up the diffuser cover as light is emitted from both the non-diffusing regions and diffusing regions and the areas between the lenses are illuminated with the existing internal stray light from the LEDs are diffused into the surroundings.

At least a part of the diffuser cover 303 protrudes from the housing and a part of the light is as a consequence diffused sideways and backwards (as indicated by arrows 319a) in relation to the source light beams. The diffusing regions of the diffuser cover can be lit up both from behind the surface and from the side and thereby function as a light guide. The light fixture can as a consequence be viewed from multiple angles and the protruding diffuser cover provides a new light effect to the light fixture.

The non-diffusing regions can be embodied as clear areas like plane transparent surfaces arranged above the light collecting means. Such clear plane transparent surfaces will allow the light source beams to pass without diffusing the light source beams. However the clear areas can be adapted to adjust the beam divergence of the light source light beam but the outgoing light beam will still be a well defined light beam. The diffuser cover can thus be embodies in clear polymer where the diffusing regions are created by etching the surface of the diffuser cover. The diffusing region can also be created by coating the regions where the diffusing region is to be positioned. The diffusing cover can further be molded where the moulds are adapted to define the non diffusing regions and the diffusing regions. The non diffusing regions can also be embodied as aperture or cut outs arranged above said light collecting means.

The diffuser cover can also comprise fastening means which enables a user to attach a diffuser cover to an illuminating device. The diffuser cover can thus be provided as a standard component or as an optional accessory.

Figure 4A:
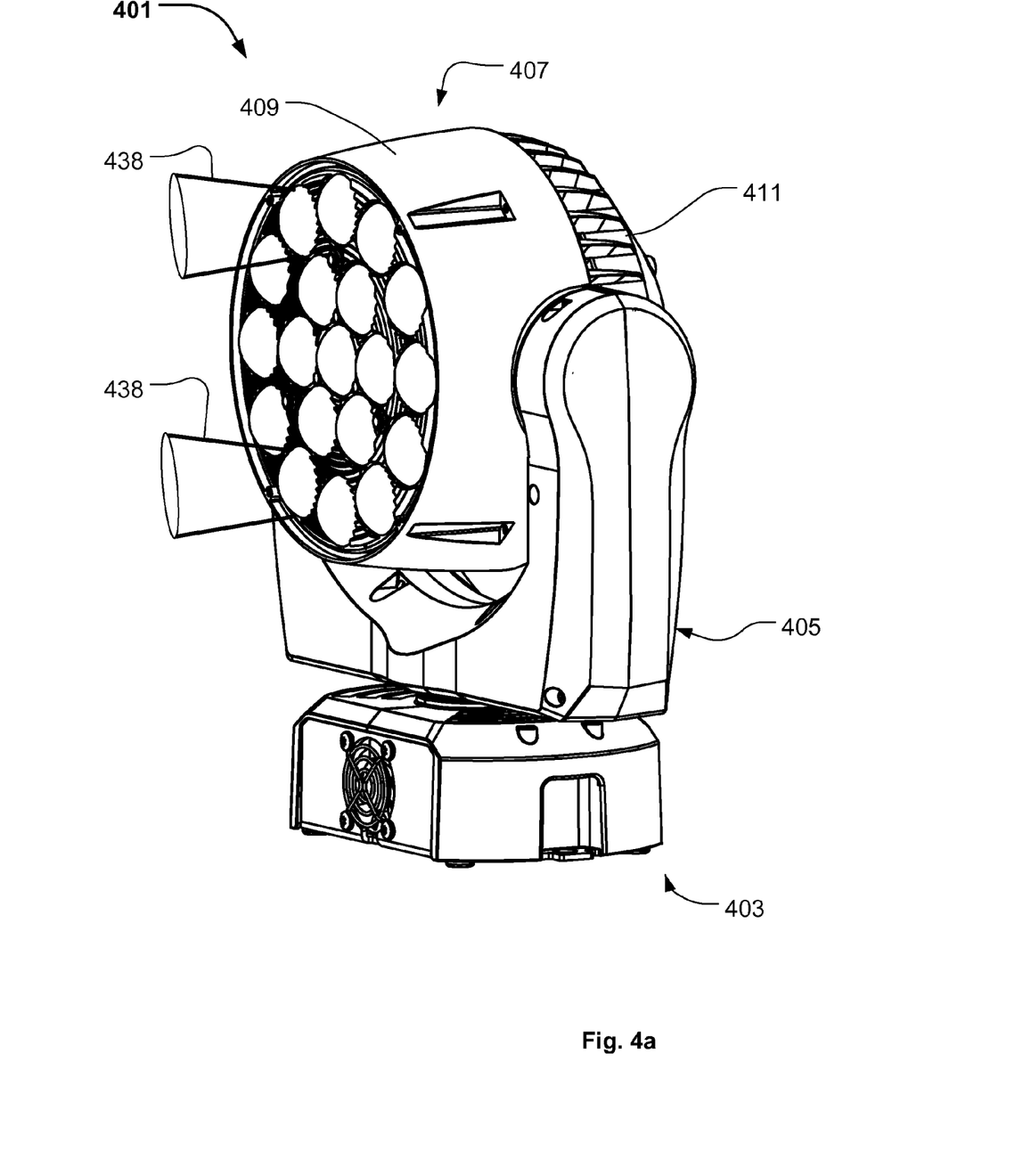
FIG. 4a-4c illustrate another embodiment of an illumination device according the present invention.
Figure 4B:
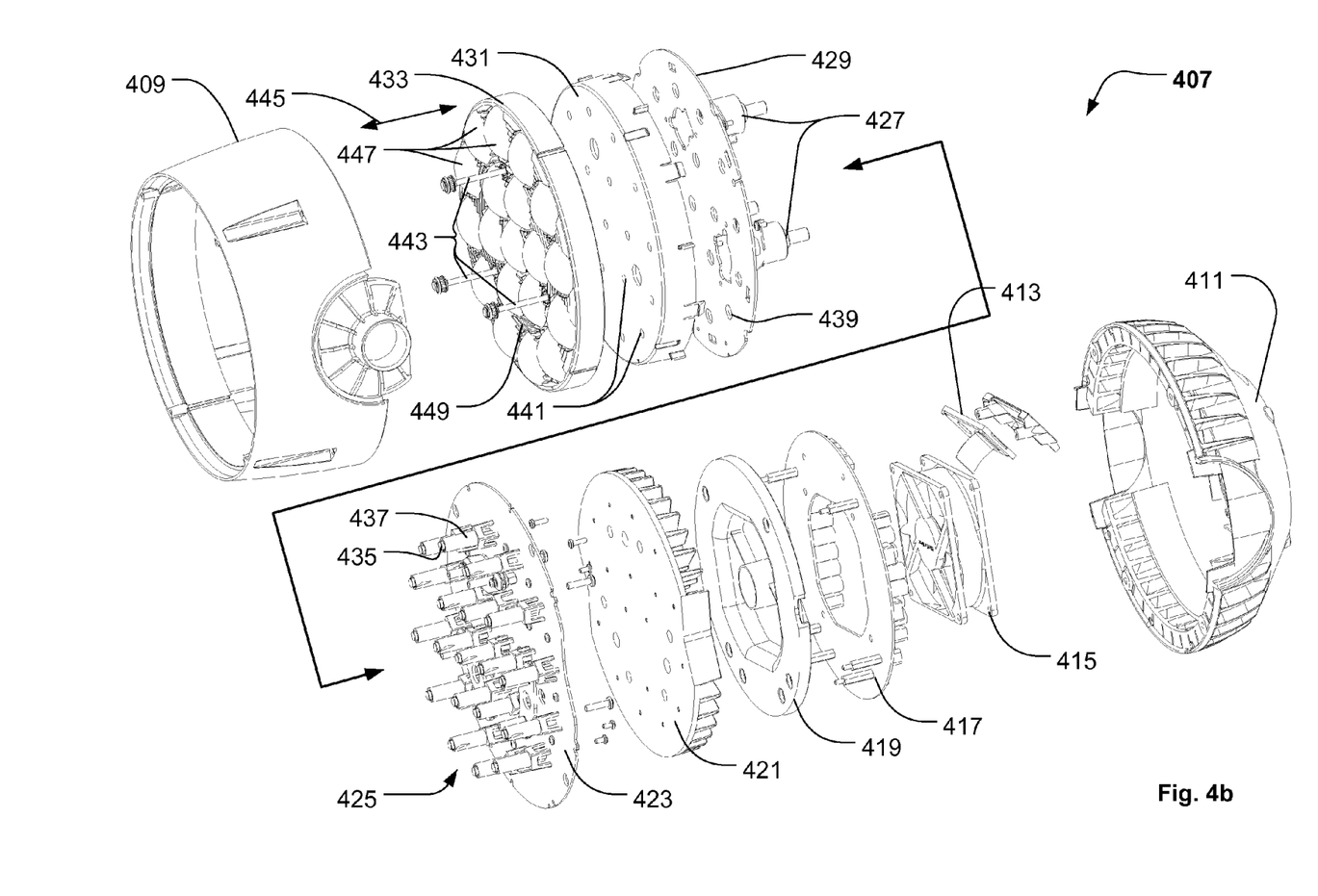
Figure 4C:
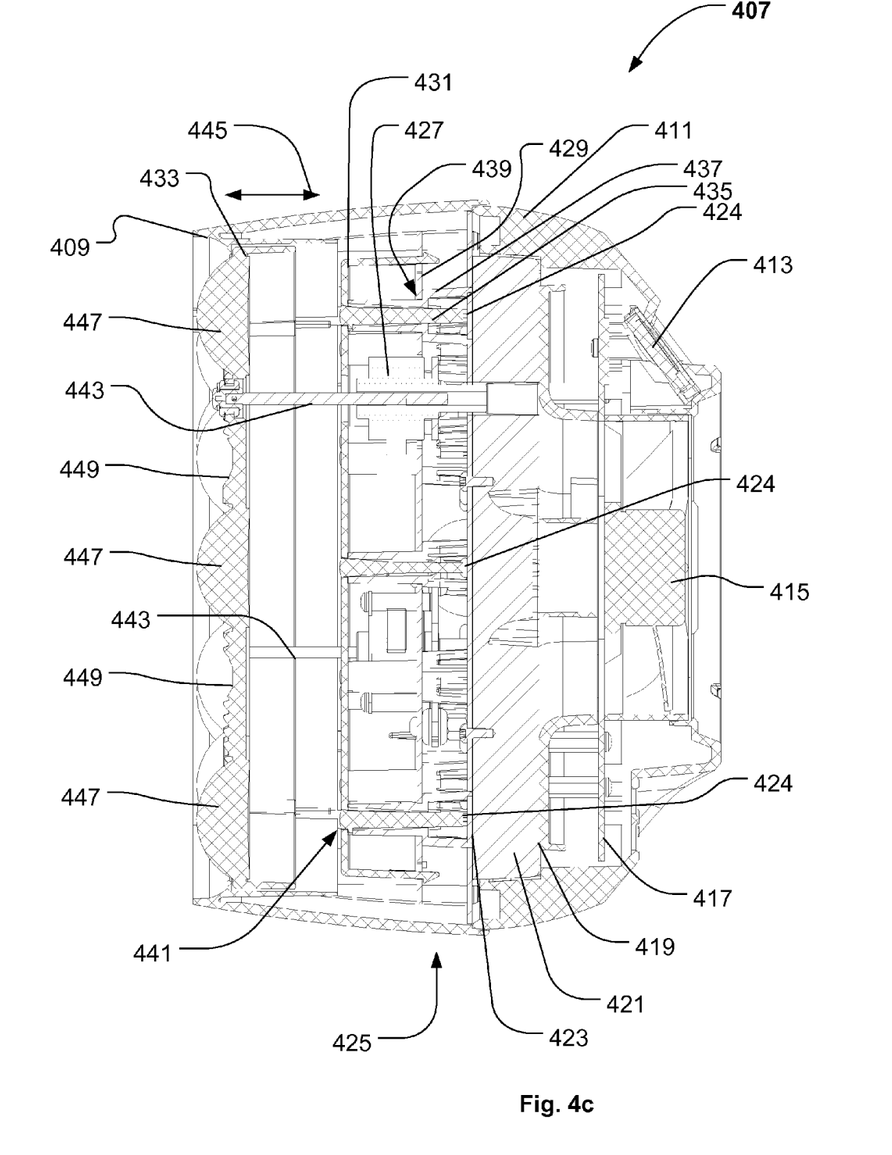

FIG. 4a-4c illustrates another embodiment of an illumination device accordion the present invention; where FIG. 4a is a perspective view, FIG. 4b is an exploded view of the head and FIG. 4c is a cross sectional view of the head. The illumination device is a moving head lighting fixture 401 comprising a base 403, a yoke 405 rotatable connected to the base and a head 407 rotatable connected to the yoke. In the illustrated embodiment the head 407 comprises a front housing 409 and a rear housing 411 that are interconnected and constitutes the head housing. The following components are arranged inside the head housing:

- a display 413 (visible from the rear side of the head)
- a fan 415
- a main PCB 417
- an air guide 419
- a heat sink 421
- a first LED PCB 423
- a light collecting assembly 425
- a number of zoom motors 427
- a second LED PCB 429
- a diffusing cover 431
- a zoom lens 433

The fan is adapted to blow air from the rear side of the housing through the main PCB 413 and the air guide 419. The air guide is adapted to guide the blown air to the center part of the heat sink 421 where after the air escapes the housing in a radial direction. As a consequence heat can be dissipated away from the first LED PCB 423. The first LED PCB 423 comprises a number of first type LEDs 424 (only shown in FIG. 4c) arranged in a first group of LEDs. The light collecting assembly 425 comprises a number of light collecting means 435 arranged in holding means 437 and each holding means 437 is adapted to position each light collecting means above one of the first type LEDs. In this embodiment the first type LEDs are 4 in 1 RGBW LEDs which comprises a red die, green die, blue die and a white die and each light collecting means is adapted to collect and mix the light from the first type LEDs and convert the collected light into a light beam. A number of light beams 438 (only shown in FIG. 4a) will thus be created by the first type LEDs and light collectors. The light collectors can for instance be embodied as described in the pending patent application DK PA 2010 70580 filed by the applicant and incorporated herein by reference.

The second LED PCB 429 is arranged above the first LED PCB 423 at the lower part of the holding means 437. The LED PCB comprises a number of a second type LEDs (not shown) and a number of holes 439 where through the light collecting means 435 and the upper part of the holding means 437 can pass. In this embodiment the second type LEDs are 4 in 1 RGBW LEDs which comprises a red die, green die, blue die and a white die. Compared to the first type of LEDs the second type of LEDs is low power LEDs and requires as a consequence less cooling. However the skilled person that it will realize that it is possible to let the second type LED be the identical to the first type of LEDs.

The diffusing cover 431 is arranged above the second LED PCB 429 and comprises a number of non-diffusing regions embodied as holes 441 wherein the top of the light collection means 435 are arranged and the light beams generated by the first type LEDs will thus pass through the diffusing cover without being diffused. In contrast hereto the light from the second type LEDs will hit the diffusing cover 431 and be diffused and as a consequence the diffusing cover 431 appears as one illuminating surface.

The illumination device comprises also a zoom lens 433 which is connected to a number to the zoom motors 427 through a number of rods 443, which can be moved back and forth the by the zoom motors 427 as illustrated by arrow 445. In this embodiment the zoom lens comprises a number of optical lenses 447 and each optical lens 447 is adapted to change the divergence of the light beams exiting the light collecting means. The consequence is that the divergence of the light beams can be changed by moving the zoom lens back and forth. The zoom lens is embodied as one transparent solid body for instance polymer or plastic and the will appear as one illuminating surface as the diffused light will pass through the zoom lens. The areas between the optical lenses 447 is provided with angled surfaces 449 which prevents light from the surroundings to be reflected in the same direction which makes the illumination device nicer to look at. It is to be understood that the zoom lens can be embodied in many different ways for instance as one common optical lens. Further it is to be understood that the zoom lens also can be embodied as the diffusing cover where the areas 449 between the optical lenses 447 can be adapted to receive and diffuse the light generated by the second type light sources. As consequence and in such embodiment the diffuser cover 431 can be omitted.

The yoke and base can be embodied as known in prior art for instance as described in FIG. 1a-1b. However the skilled person will be able to construct these parts in many different ways.

Figure 5:
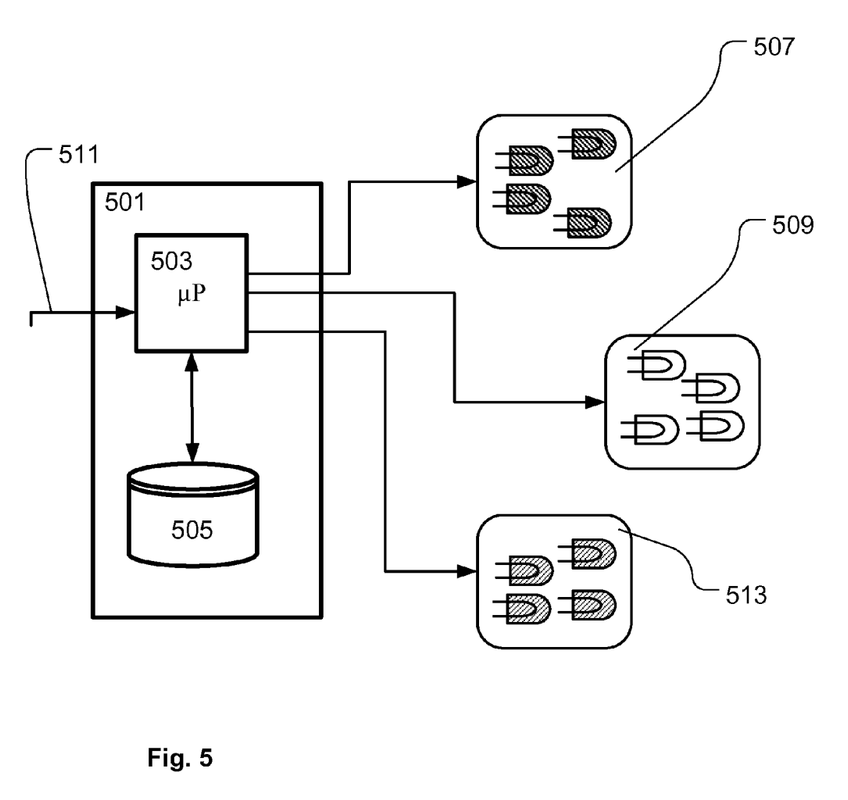
FIG. 5 illustrates a block diagram of a illumination device according to the present invention.

FIG. 5 illustrates a block diagram of the illumination device according the present invention. The illumination device comprises a control unit 501 comprising a processor 503 and a memory 505. The first group of light sources 507 and the second group of light sources 509 is connected to the control unit 501 and is arranged according to the present invention. The processor acts as controlling means and is adapted to control the first group of light sources 507 and the second group of light sources individually. Meaning the processing means can control one of the groups of light sources without controlling the other group of light sources. The controlling can for instance adapted to control the color and/or intensity of the light sources and can be based on any type of communication signals known in the art of lightning e.g. PWM, AM, FM, binary signals etc. The first 507 and second 509 group of light sources array can thus be controlled individually and independently of each other can thus be treated as two individually and independently groups of light sources. It is to be understood that the individually light sources of each groups be controlled by the same control signal, supplied with individual control signals and/or grouped in sub-groups where each subgroup receive the same control signal.

In one embodiment the controlling means is adapted to control said first group of light sources based on an input signal 511 indicative of a first target color of said first group of light sources. The input signal 511 can be any signal capable of communication parameters and can for instance be based on one of the following protocols USITT DMX 512, USITT DMX 512 1990, USITT DMX 512-A, DMX-512-A including RDM as covered by ANSI E1.11 and ANSI E1.20 standards or Wireless DMX. ACN designates Architecture for Control Networks; ANSI E1.17-2006).

The input signal can for instance be indicative of a first target color being any parameter defining the color of the light that the first group light sources shall generate, for instance RGB values, color coordinates in color maps etc. The controlling means can be adapted to control the second group of light sources based on the input signal indicative of the first target color of whereby the second group of light sources can be adapted generate substantial the same color as the color generated by the first group of light sources. However it is also possible to integrate a color scheme such that the color of the second array is adjusted such that the color of the second group of light sources is different but esthetic matches each other according to a predetermined color scheme. The input signal can also be indicative of a second target color and the color of the second group of light sources can be controlled based on this second target color parameter.

The skilled person realizes that the illumination device also can comprise further groups of light sources which can be used to crate various effects. For instance a third group 511 of light sources that can be controlled in similar manners as the two other groups of light sources.

The second and third group of light sources can functions as background lighting with own DMX control and both color and intensity can be varied independently of the first group of light sources. They can also be intensity and color linked with primary LED color in a predetermined manner or has separate control for contrast colors or other intensity. This adjustment/control of the light sources can be done remotely from central control unit or at the fixture itself. The consequence is that a new light effect can be created as the area between the light beams can have another color emitted by the second group of light sources. This look can by dynamic if first group of light sources and the second group of light sources are independently controlled as known in the art of entertainment lighting.

It is noted that:
- the Invention applies to both multichip LEDs and single color LEDs.
- the Invention applies to both profile and wash luminaires.
- the invention applies to any light source technology.
- that the invention eliminates or minimizes the dotted look of an LED lighting fixture with multiple LED lenses exposed to the spectator.
- the second light source group can be used as new additional effect feature on the fixture and function both as an attention gimmick, but more importantly as an individual pixel when used in multiple unit setups. So it is both a mid-air beam and a lit up surface.
- the second light source group can also be used to indicate errors or other fixture status information.
- the invention creates a possibility of making the light/color visible from other angles than purely from the front.
- the secondary light source can be used as an interactive part of the fixture-reacting according to surroundings.
- the illumination device according to the present invention when the fixture is used in multiple unit setups (eg. a large scale matrix) the primary light source can be turned off or dimmed, so the fixture changes from being an automated mid-air beam to become a graphical pixel with a glowing non-blinding surface. Appropriate effect generator controls (eg. media servers) are then able to display video content or simple color waves/patterns on the complete fixture setup.
- the user will be able to run two individual light sequences or media content on the same fixture.—one content generated by the first group of light sources and another content generated by the second group of light sources.
- That error messages or fixture status can be communicated via colors, color combinations, flashes or other effects by the secondary light source
- that via an internal or external sensing/tracking technology, the secondary light source can act according to a predefined reaction pattern (color, intensity or flashing). The input could be persona behavior, temperature changes, room light level, humidity etc.)

The invention claimed is:

1. An illumination device comprising:
   a number of light sources arranged in at least a first group of light sources and in a second group of light sources, where said first group of light sources and said second group of light sources are individually controllable;
   a number of light collecting means, said number of light collecting means collect light from said first group of light sources and convert said collected light into a number of source light beams;
   said number of light sources and number of light collecting means are arranged in a housing from which said light sources beams are emitted; said housing comprises a diffuser cover comprising:
   at least one diffuser region, said diffuser region receives light generated by said second group of light sources and diffuses said received light; and
   at least one non-diffusing region where through at least at part of said number of source light beams pass without being diffused;
   wherein said illumination device comprises controlling means adapted to individually control said first group of light sources and said second group of light sources and where said controlling means is adapted to control said first group of light sources based on an input signal indicative of a first target color.

2. An illumination device according to claim 1 wherein at least one of said diffuser regions is arranged between at least two non-diffusing regions.

3. An illumination device according to claim 1 wherein at least one of said light sources of said second group is arrange between at least two of said light sources of said first group.

4. An illumination device according to claim 1 wherein said controlling means are adapted to control said second group of light sources based on said first target color.

5. An illumination device according to claim 1 wherein said controlling means are adapted to control said second group of light sources based on said input signal indicative of a second target color.

6. An illumination device according to claim 1 wherein at least a part of said diffuser cover protrudes from said housing.

7. An illumination device according to claim 1 wherein at least one non-diffusing region is a clear area arranged above said light collecting means.

8. An illumination device according to claim 1 wherein at least one non-diffusing region is an aperture arranged above said light collecting means.

9. An illumination device according to claim 1 further comprising a zoom lens, said zoom lens is movable in relation to said light collecting means an is adapted to change the diverges of at least one of said light source beams.

10. A moving head light fixture comprising:

a base
a yoke connected rotatable to said base,
a head connected to rotatable said yoke,
wherein said head comprises:
 a number of light sources arranged in at least a first group of light sources and in a second group of light sources, where said first group of light sources and said second group of light sources are individually controllable;
 a number of light collecting means, said number of light collecting means collect light from said first group of light sources and convert said collected light into a number of source light beams;
said number of light sources and number of light collecting means are arranged in a housing from which said light sources beams are emitted; said housing comprises a diffuser cover comprising:
 at least one diffuser region, said diffuser region receives light generated by said second group of light sources and diffuses said received light; and
 at least one non-diffusing region where through at least at part of said number of source light beams pass without being diffused;
wherein said illumination device comprises controlling means adapted to individually control said first group of light sources and said second group of light sources and where said controlling means is adapted to control said first group of light sources based on an input signal indicative of a first target color.

11. A method of controlling an illumination device comprising the steps of:
 arranging a number of light sources in at least a first group of light sources and in a second group of light sources;
 creating a number of light source beams by adapting a number of light collecting means to collect light from said first group of light sources and to convert said collected light into said number of source light beams;
 illuminating an area between at least two of said light source beams by providing diffusing means between at least two of said light source beams and by adapting said diffusing means to receive light generated by said second group of light sources and diffuses said received light;
 controlling said first group of light sources based on a first target color;
 controlling said second group of light sources on a second target color.

12. An method according to claim 9 wherein said method comprises the steps of:
 determining said second target color based on said first target color.

\* \* \* \* \*